United States Patent Office 2,813,908
Patented Nov. 19, 1957

2,813,908

HYDRATION OF OLEFINS WITH ION EXCHANGE RESINS CATALYST

David W. Young, Westfield, N. J., assignor to Esso Research and Engineering Company, a corporation of Delaware No Drawing. Application November 15, 1954,
Serial No. 468,991

10 Claims. (Cl. 260—614)

This invention relates to the production of alcohols and ethers by the direct hydration of the lower olefins such as ethylene, propylene, and n-butylenes. It relates particularly to the preparation of isopropyl alcohol and isopropyl ether from propylene. Still more particularly it relates to a process for hydrating $C_2$–$C_4$ olefins at relatively high temperatures in the presence of a strongly acidic synthetic ion exchange resin such as a sulfonated resinous copolymer of styrene and divinylbenzene.

Recent developments indicate that the inclusion of minor amounts of oxygenated compounds such as the lower alcohols in gasoline may have important advantages, particularly in preventing carburetor icing. Other oxygenated compounds such as ethers have also been increasing in popularity, especially for various solvent purposes. As a result a need has developed for an efficient process capable of producing large amounts of materials such as isopropyl alcohol or diisopropyl ether.

Of course, the production of isopropyl alcohol by forming the ester of the alcohol as an intermediate by reaction of the olefin with sulfuric acid is an old and widely practiced process. Nevertheless, it has several serious disadvantages, the more important ones being the corrosiveness of the acid, the frequent need for neutralizing the product, and the necessity of diluting the acid in separating it from the hydrated product and the consequent need for a reconcentration step so as to allow recycling of the acid to the process. Preparation of the ether by the sulfuric acid process involves a two-step process and is basically expensive both in initial investment requirements and in operating costs.

Direct hydration of olefins in the presence of various solid catalysts has also been proposed previously as a means of avoiding the various disadvantages of the sulfuric acid hydration process. Phosphoric acid deposited on silica gel or clay, as well as reduced tungsten oxide, are typical examples of such previously used solid catalysts. However, while they avoid some of the handling problems of sulfuric acid, they in turn tend to introduce new complications, notably the production of comparatively large amounts of unwanted polymer and ketone. Furthermore, such prior catalysts have generally required very high temperatures in excess of about 500° F. if reasonably satisfactory yields and selectivities were to be obtained. See Brennstoff Chemie 34, 330 (1953). Finally, the previously known inorganic-type solid catalysts have been generally characterized by inadequate stability and correspondingly short catalyst life, especially when liquid water was present. Consequently, this required operating the hydration process in vapor phase, necessarily attended by low capacity, high temperatures and generally poor equilibrium conditions.

Patent No. 2,477,380 suggests the hydration of $C_4$ to $C_{12}$ iso-olefins in the presence of certain moderately acidic ion exchange resins such as sulfonated coal. However, this process also tends to produce large amounts of unwanted polymer, and essentially no ether. To minimize polymer formation, reaction temperatures must be kept relatively low, which of course results in low reaction rates. Furthermore, this prior process is ineffective for the hydration of normal olefins.

It is the main object of the present invention to devise a high capacity process for preparing ethers and alcohols by direct hydration of normal $C_2$–$C_4$ olefins, employing a stable solid hydration catalyst. A more specific object is to provide an olefin hydration process operated under conditions such that the water of reaction is maintained at least partly in liquid phase without substantial harm to the solid catalyst. Still another object of the invention is to provide a catalyst suited for long-term use in such a hydration process, and capable of giving high yields of both alcohol and ether. These and other objects, as well as the nature and scope of the invention, will become more clearly apparent from the following description and appended claims. In reading this description it should be understood that all ratios and percentages of materials are expressed on a weight basis, unless otherwise indicated.

It has now been discovered that olefins such as ethylene, propylene or n-butylene, or mixtures containing same, can be hydrated to the corresponding alcohols and ethers in an unusually effective and advantageous manner with the aid of certain acidic ion exchange resins, notably with certain synthetic organic cation-exchange resins in their acid form which contain free sulfonic, sulfuric, phosphoric, or phosphonic acid groups. While some isoolefin such as isobutylene may also be present in the feed in admixture with the normal olefins, the presence of the isoolefins is not particularly advantageous since they tend predominantly to form polymers rather than the desired hydration products at the relatively high temperatures preferred herein.

The ion-exchange resins suitable as catalysts in the present invention can be generically defined as synthetic aryl resins possessing essentially a hydrocarbon skeleton combined with strong mineral acid groups. These ion-exchange resins must be capable of being at least slightly swelled by water at the hydration temperature used but have a molecular weight high enough or a sufficiently cross-linked structure to be substantially insoluble in water at temperatures up to about 400° F. when containing as much as two sulfonate groups per benzene ring.

These resins may be prepared in a variety of ways from a variety of raw materials. For instance the sulfonation or equivalent acid treatment can be applied either to a monomer such as styrene which is subsequently polymerized into a suitable high molecular weight ion-exchange resin; or, preferably, the organic resin may be formed first and the acid groups introduced by treating the solid resin in suitably subdivided or granulated form.

Examples of resins particularly suitable for purposes of the present invention include solid cross-linked polymers of vinyl aromatic compounds such as styrene or vinyl toluene, or cross-linked copolymers of the vinyl aromatic compounds with other monoethylenically unsaturated compounds such as isobutylene, acrylonitrile or its homologues, acrylamide or its homologues, and methyl acrylate or methacrylate or its higher alkyl homologues. The required degree of cross-linking can be obtained either during the synthesis of the resin or by treatment after synthesis. For instance, in the case of polystyrene-type resins a minor amount in the range of about 4 to 25% of a hydrocarbon containing two non-conjugated ethylenic linkages such as divinylbenzene can be added to the styrene monomer in the polymerization mixture so as to produce a resin with a three-dimensional lattice structure. Then this interpolymerized divinylbenzene forms a cross-link between adjacent polystyrene chains. Alternatively a minor amount of a conjugated diolefin such as butadiene or isoprene can be added to the polymerization mixture to produce a thermoplastic resin which can be subsequently cross-linked by vulcanization with sulfur or the like. Still other cross-linking agents for linear or slightly cross-linked polymers such as polystyrene resins containing 2 to 4% divinylbenzene include treatment with carbon tetrachloride at 280–400° F., exposure at atmospheric temperature to gamma rays in a gamma ray source such as a cobalt 60 source at dosages of about 5 to 10 or 25 million Roentgen units, and so forth.

The best catalysts for purposes of the present invention have been prepared to date from resinous copolymers of styrene containing a minor amount of p-divinylbenzene combined therewith, resins containing about 88 to 96% styrene copolymerized with 12 to 4% of divinylbenzene being particularly satisfactory in both catalyst activity and catalyst stability.

However, instead of styrene it is permissible to use other monovinyl aromatic compounds such as p-methyl styrene, p-ethyl styrene, dimethyl styrenes, p-chlorostyrene, dichlorostyrenes, vinyl naphthalene, and so forth. While in general compounds having the vinyl group in para position to the alkyl or halogen substituents are preferred, other isomers are similarly useful also. Likewise, instead of using divinylbenzene as the cross-linking agent, other polyvinyl aryl compounds may be used such as divinyl toluene, divinyl xylene, divinyl ethyl benzene, divinyl chlorobenzene, divinyl ethers, and the like.

The polymerization of the aforementioned ingredients can be carried out by any of the well-known methods, e. g. by simple heating at an elevated temperature such as 100° C. for a suitable length of time, such as 10 days. However, it is preferable to use a catalytic amount of an oxygen-yielding compound such as benzoyl peroxide, ammonium persulfate, potassium persulfate, sodium perchlorate, sodium perborate, ozone, ozonides, etc. The polymerization can be carried out either in homogeneous phase or in emulsion. For instance, satisfactory materials can be prepared according to the procedure described in Patent No. 2,089,444 or 2,500,149. Depending on the technique employed, the polymeric resin can be produced either in the form of nearly spherical hard granules of a proper size for further use, or the polymeric resin can be produced in the form of larger masses which are reduced to the desired particle size by crushing or cutting.

Other cross-linked polystyrene-type materials suitable for the present purposes are the solid copolymers of about 40 to 70% styrene, 20 to 50% isobutylene, and about 4 to 25% divinylbenzene, prepared by the low-temperature polymerization technique described, for instance, in Patent No. 2,274,749. As still another alternative, the divinylbenzene may be replaced by a similar amount of butadiene or isoprene in the aforementioned polymerization formula and the resulting copolymer cross-linked or vulcanized after compounding with sulfur.

In making the aforementioned organic materials into the desired cation-exchange resins, they are sulfonated or phosphonated in a manner otherwise well known so as to introduce on the average about 0.25 to 3, preferably about 0.5 to 2, inorganic acid radicals per benzene nucleus of the polymeric resin. Suitable sulfonation agents include concentrated or fuming sulfuric acid, chlorosulfonic acid, sulfur trioxide in nitrobenzene, etc. An excess of the sulfonating agent is used. Depending on the sulfonating agent used, temperature of sulfonation may be in the range of about −20° to 200° C., preferably −20° to +50° C. in the case of chlorosulfonic acid. Higher temperatures are best with sulfuric acid. The resin is preferably in a relatively coarse particle size such as 20–100 mesh so as to be suitable for direct use in the eventual olefin hydration process. Thus, the subdivided copolymer, e. g. one containing 90 percent of combined styrene and 10 percent of combined divinylbenzene, can be mixed with an excess of chlorosulfonic acid, e. g. about 6 parts acid per part of copolymer, briefly heated at reflux temperature for about 3 minutes and subsequently the mixture is held at room temperature for about 50 hours. Finally, a large excess of water is added to the mixture, and the latter is then filtered, washed and dried. In a typical operation a yield of about 235 percent of sulfonated resin (based on copolymer) is thus obtained, i. e., about 235 g. of the desired sulfonated ion exchange resin can be obtained per 100 g. of the styrene-divinylbenzene hydrocarbon copolymer. This sulfonated resin contains an average of about 1.77 sulfonic acid groups in each of its aromatic nuclei. At lower temperatures a less extensively sulfonated product is obtained, e. g. one containing a single sulfonate group per aromatic ring. Such a product tends to be more stable in all respects and may, therefore, be preferred in commercial operations.

To minimize physical disintegration of the hard copolymer during sulfonation, the granules may first be swelled in a suitable solvent such as benzene, toluene, xylene, carbon tetrachloride, trichloroethylene, tetrachloroethylene and the like, in a manner substantially as described in Patent No. 2,500,149. For instance, some granulated copolymers can be swelled by contact with 10 to 50 volume percent of a solvent such as tetrachloroethylene to as much as about 170% of the original copolymer volume. However, in most instances even slight swelling is helpful in reducing subsequent disintegration. After draining off excess solvent, the swollen granules are then treated with one of the sulfonating agents mentioned above, e. g. 98% sulfuric acid.

The sulfonation reaction starts at the surface of each granule and is continued until the entire granule has been penetrated by the acid to give a complete reaction. The strength of the acid decreases as the sulfonation proceeds. After completion of the reaction the remaining acid is washed out with water, or first neutralized and then washed. As water replaces the acid, further swelling of the granules may occur, up to about 25%. Too rapid dilution with water tends to weaken the resin structure and may result in subsequent fracture of the granules. It is, therefore, advisable to replace the residual acid by slow addition of water over a period of as much as 24 hours or more. Either stepwise or continuous water addition is suitable.

The washed sulfonated product is saturated with water and in a swollen state. Thus, commercially available sulfonated resins normally contain from about 40 to 70% water. It is advisable to store such resins in water tight containers under conditions which will prevent drying out of the resin as undue loss of this water content may reduce the catalytic activity as well as the physical strength of the resin, thereby leading to disintegration of the granules upon subsequent contact with water. For instance, a resin originally containing 55% moisture may be dried out at 60% relative humidity to an equilibrium moisture content of only about 30%. When such a partially dried out resin is placed in water, water absorption may be so rapid that severe disintegration of the granules takes place.

It will be understood, of course, that the described polystyrene type ion-exchange resins as well as their preparation are well-known and readily available as commercial products. For instance, a particularly good catalyst for purposes of the present invention is a commercial cation-exchange resin known under the trade name Dowex 50X8 and made by the Dow Chemical Company. This is a sulfonated resinous copolymer of about 92% styrene and 8% divinylbenzene, which contains about 44 to 50% moisture and about 12 to 16% sulfur in the sulfonate form, based on anhydrous resin. This material has approximately the same acidity as benzene sulfonic acid. Useful materials of this type having a somewhat higher divinyl benzene content are also marketed under the names of Dowex 50X12 as well as Dowex 50X16. All of these materials are brown in color. Furthermore, a particularly outstanding material is Dowex 50WX8 which is cream colored and especially stable in the mechanical sense due to virtually complete absence of internal strains as shown by inspection under polarized light. This material is prepared by introducing the sulfonic acid groups into the polymer under special conditions so that oxidation of the polymer is almost completely avoided.

Other satisfactory sulfonated polystyrene ion exchange resins are sold by the Rohm and Haas Company under the "Amberlite" trademark, particularly "Amberlite–IR–120." All of these sulfonic acid type ion-exchange resins are usually sold in the form of sodium salts which can be readily converted or regenerated to the acid type by washing with an aqueous solution of sulfuric or hydrochloric acid in a manner well known by itself. In such regeneration the hydrogen ions of the wash acid replace the sodium ions of the resin. The ion-exchange resins in their free acid form have an acidity of about 2 to 10 milliequivalents per gram, depending on the resin base and extent of sulfonation. The preferred commercial resins usually have an acidity of about 5 milliequivalents/gram.

The present invention is applicable to the hydration of normal olefins in the $C_2$ to $C_4$ range. Accordingly, the invention is particularly applicable to the hydration of hydrocarbon fractions which contain substantial amounts, e. g., 25 to 75%, of ethylene, propylene, or n-butylenes, or mixtures thereof. The hydrocarbon feed rate or space velocity may be in the range of about 0.5 to 4 volumes of liquid olefin per volume of catalyst per hour. The product of the hydration consists largely of a mixture of the corresponding alcohols and ethers. Thus, isopropyl alcohol and diisopropyl ether are derived by hydration of propylene, etc. The ratio of alcohol to ether in the hydrated product may range from about 95:5 to 20:80, depending on the specific reaction conditions employed. In particular, relatively low olefin feed rates, e. g., those not in excess of about 1.5 volumes per volume of catalyst per hour, favor the formation of ether relative to alcohol, especially at temperatures of about 350° F. or more.

The reaction temperature is usually kept at about 250–425° F., preferably at about 250° to 330° or 350° F., the optimum depending somewhat on the particular olefin treated and the product desired. For instance, temperatures of at least 330° F. may be preferred where high ether yields are wanted, whereas lower temperatures are preferred when alcohol is desired most.

When substantial amounts of isobutylene are present in the feed in admixture with normal olefins, it may be desirable to treat the mixture first at low temperature, e. g. below 250° F., so as to hydrate the isoolefin with a minimum of polymer formation. Under such conditions the normal olefins pass through the reaction zone substantially unconverted, but can then be hydrated in accordance with the present invention in a separate step subsequent to the hydration of the isoolefin. At temperatures above about 450° F. the resins tend to be relatively unstable and have a short catalyst life.

Enough pressure is preferably employed to keep the water of hydration at least partly in liquid phase. Accordingly, reaction pressures may range from 600–3,000 p. s. i. g., preferably 600–1,500 p. s. i. g.

The catalyst is normally disposed in the reaction zone in the form of a packed bed of granular particles ranging in size from about 20 to 60 or 100 mesh. The reaction mixture is passed through such a bed either upwardly or downwardly, the latter being preferred in most instances.

Water of hydration is fed to the reaction zone in a ratio of about 0.3 to 3 moles per mole of olefin, depending at least in part on the product distribution desired. For instance, water/olefin mole ratios of at least 2 will favor the formation of alcohol. Conversely, at low feed rates, and temperatures above 330° F. and with water/olefin mole ratios of 1 or less a hydrated product containing a very large proportion of ether can be produced. The hydration product is a valuable additive for gasoline or diesel fuel which, in addition, may contain other conventional materials such as anti-oxidants, solvent oil, tricresyl phosphate, and so on.

The following specific examples will further serve to illustrate the nature, operation and advantages of the present invention.

EXAMPLE 1

A comparison was made between an ion exchange resin in its free acid form and reduced tungsten oxide as catalysts for the direct hydration of propylene. The blue tungsten oxide used in runs 1–3 was essentially the same as the catalyst described in Patent 2,683,753, being the best catalyst heretofore known for this type of reaction. The hydrogen ion exchange resin was a solid copolymer of about 92% styrene and 8% divinylbenzene sulfonated to contain, on a dry basis, about 40% sulfonic acid groups ($SO_3H$). This resin is sold commercially in the form of a sodium salt by the Dow Chemical Company under the trade name "Dowex 50X8." The sodium ions were readily replaced by hydrogen ions for purposes of the present invention by washing the resin with dilute sulfuric acid and then washing with distilled water to remove free sulfate ions from the "regenerated" acidic resin. This latter was used in runs 4–8.

The hydrations were carried out in a tubular type 304 stainless steel reactor by passing the feed through a bed of the appropriate granular catalyst. The reaction conditions and results are summarized in Table I for the runs employing tungsten oxide pursuant to prior art practice and in Table II for the runs employing the hydrogen ion exchange resin pursuant to the present invention. In each case the hydration was done with a feed containing a water/propylene mole ratio of 1/1, at a feed rate of 2 liquid volumes of propylene per volume of catalyst per hour (except as indicated), at a pressure of 1000 p. s. i. g. and at the temperature indicated. The yield data refer to dry, gasoline soluble product having a boiling range of 55 to 95° C. (the boiling range having been determined on the product prior to drying).

Table I.—Hydration of propylene over reduced tungsten oxide

| Run No. | Temp., °F. | Yield, wt. percent on $C_3^=$ | Total Conversion, mole percent | Selectivity to Isopropanol |
| --- | --- | --- | --- | --- |
| 1 | 400 | 3.3 | 2.4 | 89 |
| 2 | 450 | 14.3 | 9.9 | 86 |
| 3 | 500 | 10.6 | 9.2 | 63 |

In addition to the alcohol, the products generally contained less than 1% ether, about 1 to 2.5% acetone, and about 10 to 35% polymer.

Table II.—Hydration of propylene over sulfonated styrene-divinylbenzene copolymer

| Run No. | Temp., °F. | Yield, wt. percent on $C_3^=$ | Total Conversion, mole percent | Selectivity to Isopropanol |
| --- | --- | --- | --- | --- |
| 4 | 245 | 5.6 | 3.9 | 100 |
| 5 | 300 | 32.4 | 21.8 | 85 |
| 6 | 350 | 35.4 | 25.4 | 71 |
| 7 | 390 | 27.2 | 19.7 | 70 |
| 8 [1] | 340 | 47.1 | 34.7 | 55 |

[1] In this run the feed rate was 1 v./v./hour.

A comparison of the tabulated data indicates that the ion exchange resin gave substantially higher product yields and very much higher conversions, and this despite the fact that substantially lower temperatures were used in the resin runs. The use of such relatively low temperatures, of course, constitutes a major economical advantage. Temperatures up to about 330° or 350° F.

are seen to be particularly advantageous in giving excellent selectivity to alcohol as well as good conversion. Furthermore, the products consisted essentially of a mixture of alcohol and ether, with only a slight trace of acetone and virtually no polymer at all, less than 0.5%.

Another interesting fact is disclosed by a comparison of runs 6 and 8. Disregarding the essentially negligible difference in reaction temperature these runs were operated under the same conditions, except that the feed rate in run 8 was only one half that of run 6. But as a result of this reduced rate the yield of hydration products and the propylene conversion were greatly increased. Furthermore, the product distribution was considerably altered as indicated by the isopropanol selectivity figure. Actually, about 45% of the hydrated product proved to be diisopropyl ether. This high proportion of diisopropyl ether represents a very valuable result since the ether is an unusually desirable additive for aviation gasoline because of its excellent anti-knock properties. In contrast, the tungsten oxide catalyst produces only a mixture of alcohol and polymer, without any significant amount of ether.

EXAMPLE 2

The invention is also applicable to the hydration of other normal olefins such as ethylene. In contrast, iso-olefins such as isobutylene tend to form a product which consists largely of polymer rather than hydration product.

The data of the corresponding runs are summarized in Table III. Pure ethylene and pure isobutylene were used as indicated. The reaction pressure in all cases was 1000 p. s. i. g. The catalyst in each case was Dowex 50×8 resin, in its acidic form.

Table III.—Treatment of ethylene and isobutylene over ion exchange resins

| Run No. | Feed | Temp., °F. | Olefin Feed Rate, v./v./hr. | Water/Olefin Mole Ratio | Yield, Wt. Percent Liquid on Olefin | Analysis of Product |
|---|---|---|---|---|---|---|
| 9 | C₂⁻ | 400 | 2 | 1/1 | 4.5 | 100% alcohol. |
| 10 | C₂⁻ | 400 | 1 | 2/1 | 4.8 | 100% alcohol. |
| 11 | IsoC₄⁻ | 350 | 2 | 1/1 | ¹ 43.7 | {10% alcohol. 90% polymer. |
| 12 | IsoC₄⁻ | 250 | 1 | 1/1 | ¹ 48.6 | {74% alcohol. 26% polymer. |

¹ Portion of product boiling between 70° C. and 95° C. (boiling range determined prior to drying).

The data show clearly that ethylene can be hydrated by means of the present invention to form alcohol at a high degree of selectivity. In contrast, isobutylene under similar conditions gives a product which consists predominantly of polymer. And while this tendency can be counteracted somewhat by operating at lower temperatures, even at 250° F. the polymer formation is quite substantial.

EXAMPLE 3

The effect of the extent of cross-linking was studied in connection with a series of commercial polystyrene resins (Dowex 50) containing various amounts of divinylbenzene (DVB) as cross-linking agent. All resins had been sulfonated to contain 40% sulfonic acid groups and were used in a granular form of 50–100 mesh size. Except in run 25 where a feed containing equal amounts of propane and propylene was used, the resins, in acidic form, were evaluated in connection with the hydration of pure propylene at 350° F., 1000 p. s. i. g. pressure, under downflow conditions with a fixed bed catalyst. The other reaction variables and results obtained are summarized in Table IV. In each case it was observed that the water content of the various resins tended to drop from an initial value of about 44 to 50% to about 28 to 32% at the end of the run.

Table IV.—Effect of resin cross-linking

| Run No. | Resin, Percent DVB | C₃⁻ Feed Rate, v./v./hour | H₂O/C₃⁻ Mole Ratio | Yield, Wt. Percent | Product Composition, Percent | |
|---|---|---|---|---|---|---|
| | | | | | Alcohol | Ether |
| 13 | 4 | 0.5 | 0.5 | 26.8 | 54 | 46 |
| 14 | 8 | 0.5 | 0.5 | 26.4 | 55 | 45 |
| 15 | 12 | 0.5 | 0.5 | 26.7 | 57 | 43 |
| 16 | 16 | 0.5 | 0.5 | 27.4 | 58 | 42 |
| 17 | 4 | 1 | 1 | 38.2 | 54 | 46 |
| 18 | 8 | 1 | 1 | 43.0 | 58 | 42 |
| 19 | 12 | 1 | 1 | 47.0 | 59 | 41 |
| 20 | 16 | 1 | 1 | 47.1 | 62 | 38 |
| 21 | 4 | 2 | 1 | 32.0 | 63 | 37 |
| 22 | 8 | 2 | 1 | 38.0 | 69 | 31 |
| 23 | 12 | 2 | 1 | 33.1 | 69 | 31 |
| 24 | 16 | 2 | 1 | 38.0 | 79 | 21 |
| 25 | 8 | 1 ¹ | 1 | ² 60 | 59 | 41 |

¹ Feed contained 50% propylene and 50% propane.
² Mole percent.

The results indicate that there is a slight gain in yield as the divinylbenzene content of the resin is increased. On this basis sulfonated polystyrene resins containing at least 5% divinylbenzene cross-linking are of particular interest. Increased cross-linking of the resin also tends to increase the alcohol/ether ratio of the hydrated product. Ether formation is favored by relatively low olefin feed rates (compare runs 17–20 with runs 21–24). It is observed that the ether formation can be quite substantial and represents a valuable source for this type of material. Data not reproduced here also show that relatively high temperatures, e. g. 350° F. or over, also favor ether formation. On an over-all basis the results of run 22 appear to be the most desirable, though runs 18, 19, 23 and 25 were also satisfactory. The short-term yields and product quality obtained in the runs with the 16% divinylbenzene resin were also satisfactory. However, the 16% divinylbenzene resin, which was rather brittle, proved unsatisfactory in extended runs since it proved to be quite unstable, decreasing considerably in particle size and losing about 33% of its sulfonate content in a period of 50 hours. In contrast, the 8% divinylbenzene resin proved particularly stable in the extended runs, losing less than 10% sulfur. It is significant to note that no polymer was formed in any run.

EXAMPLE 4

The effect of the extent of divinylbenzene cross-linking on the relative stability of the various sulfonated polystyrene resins (Dowex 50), regenerated to their free acid form, was further determined as follows. All resins had approximately the same initial sulfonate content. Each resin was screened to obtain a sample consisting of 50–100 mesh particles. 20 grams of the screened sample were placed in a 1 liter steel bomb with 600 ml. water and kept on a rocker at 355° F. for various lengths of time. At the end of each test period a representative portion of the sample was dried in a hot air oven at 230° F. for 48 hours, and its sulfur content was finally determined. The results obtained are indicated in Table V.

Table V.—Effect of DVB cross-linking on resin stability and solubility

| DBV Content of Resin, Percent | Time of Heating, Hours | | | | Comments |
|---|---|---|---|---|---|
| | 0 | 24 | 48 | 120 | |
| | Sulfur, Percent | Sulfur, Percent | Sulfur, Percent | Sulfur, Percent | |
| 1 | 13.30 | | 11.97 | | Went into solution. |
| 2 | | 12.74 | | 10.45 | Do. |
| 4 | 11.78 | | 10.73 | | Did not dissolve. |
| 8 | 11.84 | | | 11.37 | Do. |
| 12 | 11.21 | | 10.94 | | Do. |

It is apparent that all of the resins tested have satisfactory stability in water at the temperature used for the olefin hydration. However, the resins containing less than 4% divinylbenzene cross-linking agent are unsuited for the present invention, because they are too readily soluble in water.

Other acidic resins similarly tested for stability included a black-colored phosphonic hydrogen ion exchange resin having a particle size of 5 to 10 mesh (Victor Resin I-B7773, Victor Chemical Co.), and another brand of a sulfonated polystyrene-divinylbenzene hydrogen ion exchange resin (Amberlite IR 120-7495), containing about 10% combined divinylbenzene.

When the above mentioned phosphonic resin was used for hydrating propylene at 350° F., 1000 p. s. i. g. pressure, feed rate of 2 volumes of propylene, per volume of catalyst per hour, and a feed ratio of 1 mole of water per mole of propylene in a downflow operation, the yield of hydrated product on propylene feed was 14.5%; the product contained 91% isopropyl alcohol, 9% diisopropyl ether, and no polymer.

Having described the general nature and illustrative embodiments of the invention, it is to be understood that its true scope is particularly pointed out in the appended claims.

What is claimed is:

1. A process for converting a normal monoolefinic hydrocarbon feed having 2 to 4 carbon atoms per molecule into a hydration product which comprises maintaining a feed mixture of said normal olefinic hydrocarbon feed and water at least partly in liquid phase in a closed conversion zone under hydration conditions at a temperature between about 250 and 425° F. in contact with a catalyst which comprises a sulfonated synthetic aryl cation exchange resin in its acid form possessing essentially a hydrocarbon skeleton and which has an acidity of about 2 to 10 milliequivalents per gram and is stable and insoluble under the reaction conditions.

2. A process according to claim 1 wherein the olefinic portion of the feed consists essentially of a normal olefin of 3 to 4 carbon atoms, and wherein the resin is a sulfonated cross-linked polymer of a styrene.

3. A process for making alcohols, ethers and mixtures thereof which comprises passing a feed mixture of a normal $C_3$ to $C_4$ monoolefinic hydrocarbon and water at least partly in liquid phase through a closed conversion zone under hydration conditions at a temperature between about 250° and 330° F. over a catalytic ion exchange resin in its acid form which comprises a solid sulfonated copolymer of about 88 to 96% of a styrene and correspondingly 12 to 4% of a divinylbenzene and possesses an acidity of 2 to 11 milliequivalents per gram and is stable and insoluble under the reaction conditions.

4. A process according to claim 3 wherein the water/olefin mole ratio of said feed mixture is between about 0.3 and 3.

5. A process according to claim 3 wherein the mole ratio of water to olefin in said feed mixture is between about 0.5 and 0.9.

6. A process according to claim 3 wherein the hydrocarbon feed consists essentially of a $C_3$ hydrocarbon fraction having a propylene content of about 25 to 75% and wherein the catalytic resin is a copolymer of 88 to 96% styrene and 12 to 4% p-divinylbenzene sulfonated to contain about 0.5 to 2 sulfonate radicals per aromatic ring.

7. A process according to claim 6 for preparing a hydration product rich in ether wherein the water/olefin mole ratio in the feed is between about 0.5 and 1.5 and the reaction temperature is between 250° and 350° F.

8. A process according to claim 7 wherein the olefin is fed into the conversion zone at a rate of about 0.5 to 1.5 volumes of liquid olefin per volume of resin catalyst per hour.

9. A process according to claim 6 wherein the pressure is between about 600 and 1,500 p. s. i. g.

10. A process according to claim 6 wherein the feed mixture is passed through the reaction zone in a downward direction.

References Cited in the file of this patent

UNITED STATES PATENTS

| | | |
|---|---|---|
| 2,055,720 | Francis | Sept. 29, 1936 |
| 2,366,007 | D'Alelio | Dec. 26, 1944 |
| 2,566,559 | Dolnick et al. | Sept. 4, 1951 |

OTHER REFERENCES

Nachod: "Ion Exchange," p. 267 (1 pg. only); publ. by Academic Press, Inc., New York (1949).

"Amberlite Ion Exchange," p. 10 (1 pg. only), publ. by Rohm & Haas Co., Philadelphia (September 1953).